(12) United States Patent
Baranovski et al.

(10) Patent No.: US 9,845,206 B1
(45) Date of Patent: Dec. 19, 2017

(54) METHOD AND APPARATUS FOR DIRECT INJECTION OF POWDER MATERIAL INTO A POWDER HOSE

(71) Applicants: Viacheslav E. Baranovski, Maidens, VA (US); Andrew V. Baranovski, Sandy Hook, VA (US)

(72) Inventors: Viacheslav E. Baranovski, Maidens, VA (US); Andrew V. Baranovski, Sandy Hook, VA (US)

( * ) Notice: Subject to any disclaimer, the term of this patent is extended or adjusted under 35 U.S.C. 154(b) by 0 days.

(21) Appl. No.: 15/583,305

(22) Filed: May 1, 2017

(51) Int. Cl.
| | |
|---|---|
| *B65G 53/14* | (2006.01) |
| *B65G 53/18* | (2006.01) |
| *C23C 4/129* | (2016.01) |
| *B05B 7/14* | (2006.01) |
| *B65G 33/14* | (2006.01) |
| *B65G 53/36* | (2006.01) |
| *B65G 53/48* | (2006.01) |

(52) U.S. Cl.
CPC .............. *B65G 53/18* (2013.01); *B05B 7/144* (2013.01); *B05B 7/1463* (2013.01); *B65G 33/14* (2013.01); *B65G 53/36* (2013.01); *B65G 53/48* (2013.01); *C23C 4/129* (2016.01)

(58) Field of Classification Search
CPC ........ B65G 53/08; B65G 53/14; B65G 53/22; B65G 53/28
USPC ........... 406/55, 56, 61, 90, 91, 92, 138, 153; 222/637
See application file for complete search history.

(56) References Cited

U.S. PATENT DOCUMENTS

| | | | |
|---|---|---|---|
| 954,944 A * | 4/1910 | Dunn | B65G 53/08 110/105 |
| 1,195,186 A | 8/1916 | Coutant | |
| 1,450,903 A | 4/1923 | Newhouse | |
| 1,948,812 A | 2/1934 | Williams | |
| 2,127,693 A | 8/1938 | McCanless | |
| 2,957,608 A | 10/1960 | Wahl | |
| 3,004,799 A | 10/1961 | Tikal | |
| 3,099,496 A | 7/1963 | Kayser | |
| 3,482,782 A | 12/1969 | Wilson | |
| 3,485,535 A * | 12/1969 | Fabre | B65G 53/08 406/138 |
| 3,909,068 A | 9/1975 | Coucher | |
| 4,138,162 A * | 2/1979 | Noren | B65G 53/14 406/61 |
| 4,502,820 A | 3/1985 | Fujii | |
| 4,726,715 A | 2/1988 | Steen | |

(Continued)

*Primary Examiner* — Joseph A Dillon, Jr.
(74) *Attorney, Agent, or Firm* — Patent Law of Virginia, PLLC; Brian J. Teague (57) ABSTRACT

A powder feed assembly comprises a powder hopper, a motor, an auger housing, an auger, a porous gas-permeable powder filter, a carrier gas inlet, an auger sleeve, and a powder hose. The auger housing receives a powder from the opening in the hopper floor into a powder chamber defined in the auger housing. The auger is selectively rotatable to propel the powder from the powder chamber past the distal end of the auger and into the auger sleeve. The carrier gas inlet introduces carrier gas into an inner chamber of the auger housing. The wall of the auger sleeve allows at least some of the carrier gas to flow or permeate into the internal bore of the auger sleeve to pick up and carry the propelled powder out of the auger housing. The powder hose directs the carrier gas and carried powder from the auger housing to a powder dispenser.

7 Claims, 5 Drawing Sheets

(56) References Cited

U.S. PATENT DOCUMENTS

| | | | |
|---|---|---|---|
| 2,092,267 A | | 3/1992 | Hajek |
| 5,092,267 A | * | 3/1992 | Hajek ................. B05B 7/144 |
| | | | 118/309 |
| 5,240,185 A | * | 8/1993 | Kaiju .................... B01J 8/36 |
| | | | 222/412 |
| 5,996,855 A | | 12/1999 | Alexander |
| 6,073,818 A | * | 6/2000 | Rothenberg ...... A61M 15/0065 |
| | | | 222/412 |
| 6,220,486 B1 | | 4/2001 | Teramachi |
| 6,892,909 B1 | * | 5/2005 | Hebert ................ A01C 7/081 |
| | | | 111/174 |
| 7,469,781 B2 | | 12/2008 | Chataing |
| 8,011,861 B2 | | 9/2011 | Sprouse |
| 2003/0190200 A1 | * | 10/2003 | Hajima ............... B05B 7/1404 |
| | | | 406/191 |
| 2006/0002774 A1 | | 1/2006 | Stumborg |
| 2012/0000165 A1 | | 1/2012 | Williams |
| 2013/0105526 A1 | * | 5/2013 | Ross ................... B29B 13/022 |
| | | | 222/630 |
| 2014/0021224 A1 | | 1/2014 | Massicotte |
| 2014/0294517 A1 | | 10/2014 | Harvey |

\* cited by examiner

METHOD AND APPARATUS FOR DIRECT INJECTION OF POWDER MATERIAL INTO A POWDER HOSE

FIELD OF THE INVENTION

The present invention relates generally to powder feeding, and more particularly to an apparatus and method for feeding powder to an enriched air flame spray apparatus.

BACKGROUND

In the field of thermal spray, a range of different types of powder feeders are utilized to convey a spray powder material via a powder hose to a spray gun. Powder feeders are generally either mechanical or pneumatic in design. Mechanical powder feeders rely on feeding screws (augers), metering blades, or other actuators that selectively dose the powder, which is then propelled into a collecting cone and further downstream into a powder hose.

Both mechanical and pneumatic powder feeders are prone to producing pulsating powder flows for a variety of reasons. One common cause of pulsation is undesirable accumulation of powder inside the collecting cones or voids and pockets of the metering mechanism of the powder feeder. During regular operation, especially at high feed rates, powder can accumulate inside a collecting cone, temporarily blocking the flow, until it is pushed through by the pressure of the carrier gas, creating a spike in the resultant powder flow. Similarly, powder can also accumulate in the internal pockets, voids, or channels of the powder feeder or its metering mechanism, and then get dislodged and be carried downstream as one mass, similarly producing a temporary spike in the powder flow. All powders can create these undesirable aberrations in normal operation, but clumping powders are particularly prone to creating this type of issue. The resultant powder flow is often unsteady, containing ebbs and spikes that can be highly detrimental to achieving a uniform coating quality.

Therefore, there is a need for a powder feeder for a thermal spray application that can convey a powder through a powder hose uniformly, free of pulsation, and unaffected by the flow characteristics of the powder being conveyed. The device of the present disclosure accomplishes at least the above objectives and overcomes the above-described or other disadvantages of conventional powder feeders.

BRIEF SUMMARY

In one embodiment of the invention, a powder feed assembly comprises a powder hopper, a motor, an auger housing, an auger, a porous gas-permeable powder filter, a carrier gas inlet, an auger sleeve, and a powder hose. The powder hopper has a wall, a lid, and a sloped floor together forming a chamber. An opening is defined in the floor. The motor is within a motor chamber defined in a motor housing. The motor has a selectively rotatable shaft connected to an auger holder. The auger housing is positioned to receive a powder from the opening in the hopper floor into a corresponding powder chamber defined in the auger housing. The motor housing is affixed to the auger housing. The auger housing defines (i) a first auger bore providing an opening between the motor chamber and the powder chamber and (ii) a second auger bore providing an opening between the powder chamber and an inner chamber defined in the auger housing. The auger is at least partially within the auger housing. The auger has a proximal end and a distal end. The auger has a shaft and a spiral blade projecting from the shaft. The proximal end of the auger protrudes through the first auger bore and connects to the auger holder. The distal end of the auger protrudes at least partly through the second auger bore such that the auger is selectively rotatable to propel the powder from the powder chamber past the distal end of the auger when the auger is selectively rotated. The porous gas-permeable powder filter is positioned within the powder chamber and shaped such that a circumferential cavity is defined around the powder filter. The circumferential cavity is fluidly connected via a carrier gas release bore to the inner chamber of the auger housing. The carrier gas inlet is affixed to the auger housing for receiving a carrier gas and introducing the carrier gas into the inner chamber of the auger housing. The auger sleeve is within the auger housing and positioned at least partially within the inner chamber. The auger sleeve has a wall defining an internal bore positioned to receive the distal end of the auger and therefore the propelled powder. At least a portion of the wall of the auger sleeve past the distal end of the auger allows at least some of the carrier gas to flow or permeate through the auger sleeve wall and into the internal bore of the auger sleeve to pick up and carry the propelled powder out of the auger housing. The powder hose directs the carrier gas and carried powder from the auger housing to a powder dispenser. The powder hose has a distal end adapted to be connected to the powder dispenser and a proximal end connected to the auger housing.

A plurality of openings may be defined in the wall of the auger sleeve.

The auger sleeve may be made from a porous gas-permeable material.

The assembly may further comprise an additional solid auger sleeve positioned within the internal bore of the auger sleeve, with the solid auger sleeve positioned to receive the distal end of the auger. The solid auger sleeve may comprise a cylindrical wall having a plurality of openings defined in the wall past the distal end of the auger.

The powder hose may be connected to the auger housing via the auger sleeve.

The assembly may further comprises a first carrier gas tube fluidly connecting the inner chamber of the auger housing to the chamber of the powder hopper such that carrier gas can move freely between the inner chamber of the auger housing and the chamber of the powder hopper, and a second carrier gas tube fluidly connecting the inner chamber of the auger housing to an inner chamber of the motor housing such that carrier gas can move freely between the inner chamber of the auger housing and the inner chamber of the motor housing.

In addition to powder feed assemblies, as described above, other aspects of the present invention are directed to corresponding methods for feeding powder.

BRIEF DESCRIPTION OF THE SEVERAL VIEWS OF THE DRAWING(S)

Reference is made herein to the accompanying drawings, which are not necessarily drawn to scale, and wherein.

DETAILED DESCRIPTION

Embodiments of the invention comprise a powder feeding apparatus able to provide pulse-free and consistent powder flow to a thermal spray apparatus or some other device working with powder media. A powder feeding apparatus of embodiments of the invention may be used to supply powder to a thermal spray apparatus (such as a thermal spray gun), although embodiments of the invention are not limited to use with thermal spray apparatuses.

For this reason an effort has been made to design a powder feeder that injects a powder material directly into a powder hose, bypassing collecting cones, voids, pockets, and other channels, where powder accumulation may occur. The present invention utilizes micro-augers, that are substantially comparable in size to internal diameters of common powder hoses (that typically are 2-4 mm in diameter), to mechanically inject powder material directly into a powder hose, creating a uniform flow that is both free from pulsation and is unaffected by flowability characteristics of powders being used.

Figure 1:
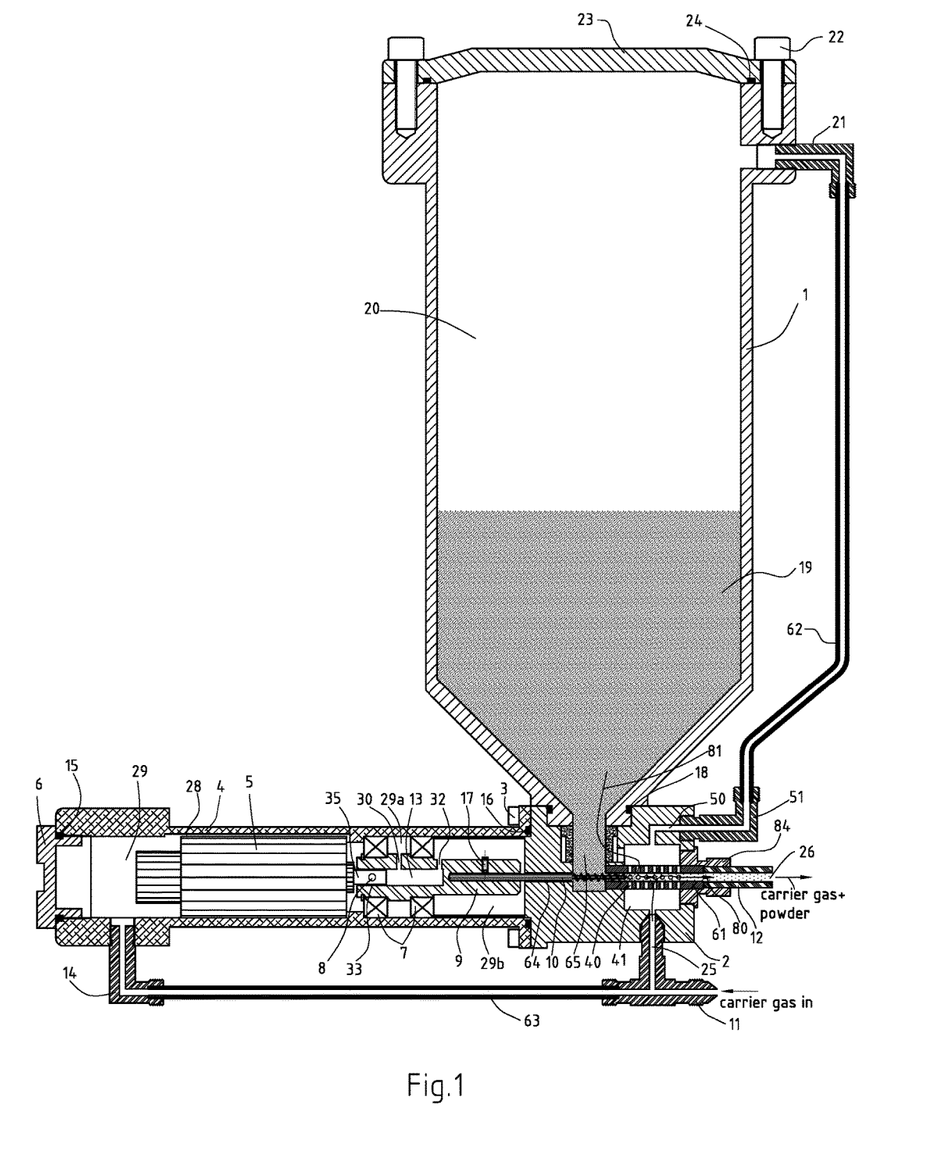
FIG. 1 is a cross-sectional side view of a powder feeding apparatus, in accordance with embodiments of the invention.
Figure 2:
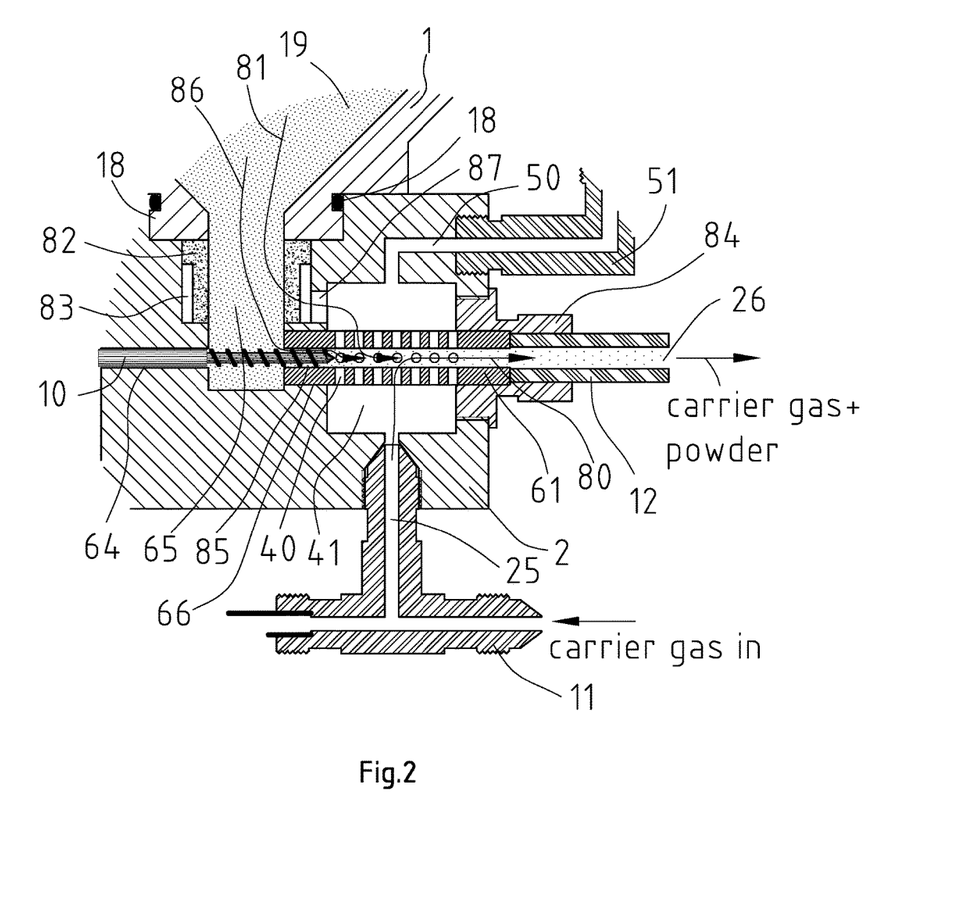
FIG. 2 is an enlarged view of the lower right portion of the powder feeding apparatus of FIG. 1.

Referring now to FIGS. 1 and 2, a powder feed assembly (such as for an enriched air flame spray apparatus) of embodiments of the invention comprises a powder hopper 1, an auger housing 2, an auger 10 within the auger housing, a carrier gas inlet 11 affixed to the auger housing, a powder hose 12 attached to the auger housing 2 via a powder hose fitting 84, and an electric motor 5 housed within a motor chamber 29 of a motor housing 4 that is attached to the auger housing 2.

The powder hopper 1 has a wall and a sloped floor (which is funnel-shaped in the illustrated embodiment) together forming a chamber 20 for holding a powder 19. An opening is defined in the floor, through which the powder 19 may be deposited into the auger housing (described below). An opening at the top of the hopper 1 allows for powder 19 to be inserted in the chamber 20. The opening may be closed off by lid 23, which may be secured by bolts 22. An O-ring 24 may be used to help provide an airtight seal. An inlet port or nipple 21 may provide an opening into the powder hopper into which carrier gas may be introduced (via pressure equalizing tubing 62 fluidly connected to the inner chamber 41 of the auger housing 2 (described below) via orifice 50 and fitting 51). Carrier gas may be introduced into the powder hopper to help prevent the back flow of the carrier gas from the carrier gas channel (described below) during start-up operation of the spray gun.

The auger housing 2 includes a powder chamber 65 that is positioned to receive the powder 19 from the opening in the hopper floor via a corresponding opening in the auger housing. The auger housing 2 may be affixed to the powder hopper, and an O-ring 18 may be used to provide a good seal between the powder hopper and the auger housing. The auger housing 2 has a powder outlet defined in the downstream end, into which a powder hose fitting 84 and powder hose 12 are inserted. The auger housing 2 defines (i) a first auger bore 64 which provides an opening between the motor chamber 29 and the powder chamber 65 and (ii) a second auger bore 66 provides an opening between the powder chamber 65 and the inner chamber 41 of the auger housing.

An auger 10 resides in the auger housing 2. The auger 10 has a shaft and a spiral blade affixed to the shaft. The auger 10 may be termed a micro-auger, as the auger 10 will typically be very small in diameter. In one specific embodiment of the invention, the auger has an overall diameter (i.e., the diameter including the blade) of 3 mm, a shaft diameter of 2 mm, and an effective length (i.e., the length of the portion having the spiral blade) of 15 mm. The proximal end of the auger 10 protrudes through the first auger bore 64 to connect to the motor 5 (described below) and the distal end of the auger 10 protrudes at least partly through the second auger bore 66 and into an auger sleeve (described below), such that the auger 10 is selectively rotatable to propel the powder 19 from the powder chamber 65 past the distal end of the auger 10 and into the inner chamber 41 when the auger 10 is selectively rotated. The gap between the shank portion of the auger and the inner diameter of the first auger bore 64 of the auger housing 2 is sized to allow the auger to rotate freely while minimizing the flow of powder particles within the gap. The gap 85 between the auger shaft and the inner diameter of the auger sleeve 61 should be larger than the largest particle in the powder 19.

As the powder 19 moves from the hopper to the auger housing 2, the powder falls onto the auger 10. The auger 10 rotates to propel the powder through the auger housing (left to right in the figures) via the auger sleeve 61 (described further below), out through the powder hose fitting 84 and powder hose 12.

The carrier gas inlet 11 is affixed to the auger housing 2. The carrier gas inlet 11 receives a carrier gas and introduces the carrier gas, via channel 25, into the inner chamber 41 of the auger housing 2. The carrier gas inlet 11 is coupled to a carrier gas supply hose (not illustrated) to supply carrier gas (nitrogen, air, etc.) from a carrier gas supply tank (not illustrated), through a flow controlling device, such as manual flow control valve, or a mass flow controller (not illustrated), to the carrier gas inlet. The input of the carrier gas into the carrier gas inlet 11 is illustrated in FIGS. 1 and 2 with an arrow labeled "carrier gas in."

An auger sleeve 61 is positioned at least partially within the inner chamber 41 of the auger housing 2. In the illustrated embodiment, the proximal or upstream end of the auger sleeve 61 fits (typically snugly) within the second auger bore 66 of the auger housing 2, the distal or downstream end of the auger sleeve 61 fits (typically snugly) within the powder hose fitting 84, and a center portion of the auger sleeve 61 is within the inner chamber 41. The auger sleeve 61 has a (typically cylindrical) wall that defines an internal bore positioned to receive the distal end of the auger 10 and therefore the powder that is propelled by the auger. The auger sleeve's internal diameter is preferably equal to the inner diameter of the connected powder hose. At least a portion of the wall of the auger sleeve (the portion that is past the distal end of the auger) allows at least some of the carrier gas to flow or permeate through the auger sleeve wall and into the internal bore of the auger sleeve. In this regard, one or more radial holes 40 may be defined in the auger sleeve 61. In the embodiment illustrated in FIGS. 1 and 2, there are twenty-eight radial holes (twenty-one of which are visible (fourteen in cross-section)), but any suitable number of radial holes may be present. As described further below, the radial holes 40 in the auger sleeve 61 allow the carrier gas that is introduced via the carrier gas inlet 11 into the inner chamber 41 of the auger housing 2 to enter the auger sleeve 61 in order to carry the powder propelled by the auger 10 out of the auger housing and down the powder hose 12 to the spray gun. The position of the auger sleeve 61 within the inner chamber 41 provides a circumferential space around the auger sleeve 61, such that the introduced carrier gas surrounds the auger sleeve 61 and enters the auger sleeve through all of the radial holes 40.

A porous gas-permeable powder filter 82 may be positioned within the powder chamber 65. The porous gas-permeable powder filter 82 is typically cylindrical, such that the powder entering the powder chamber 65 from the hopper 1 falls through the center opening of the porous gas-permeable powder filter 82 and onto the auger 10. The porous gas-permeable powder filter 82 is positioned and shaped such that a circumferential cavity 83 surrounds the porous gas-permeable powder filter 82. The circumferential cavity 83 is fluidly connected via a carrier gas release bore 87 to the inner chamber 41 of the auger housing 2. The porous powder filter 82 comprises a sponge-like solid material having a high porosity such that the carrier gas can permeate through but the powder cannot. The porous powder filter 82 is typically constructed of a metal, such as brass, bronze, steel, or the like.

An electric motor 5 is used to rotate the auger 10. Any suitable motor may be used. The motor may be fixed speed or variable speed. The motor is housed within a motor chamber 29 of a motor housing 4. The motor housing 4 is affixed to the auger housing 2 using any suitable mechanism, such as via screws 3. It is desirable that the motor housing 4 be airtight, so carrier gas can be introduced into the motor housing and directed as described below. An O-ring 16 may be used to seal the connection between the motor housing and auger housing. The motor housing 4 may have an end plug 6, which may also be sealed with an O-ring 15.

The motor 5 has a shaft 35 that rotates when the motor is energized. The motor shaft is coupled to the auger, directly or indirectly, such that rotating the motor shaft rotates the auger, using any suitable connection mechanism. In the illustrated embodiment, the motor shaft 35 is coupled to the auger shaft via a coupling shaft 9 (which may also be termed an auger holder). A pin 8 (or the like) transfers torque from the motor 5 to the coupling shaft 9. The use of pin 8 enables a gap 33 to exist between the motor shaft 35 and the coupling shaft 9 to permit carrier gas flow as described below. A set screw 17 (or the like) helps secure the auger shaft to the coupling shaft 9. Shaft bearings 7 may be used to support the coupling shaft 9 as it rotates. Use of precise bearings 7 also reduces undesirable radial runout of the auger 10 during rotation.

The motor housing 4 has a carrier gas inlet port or nipple 14 for receiving carrier gas (via pressure equalizing tubing 63 attached to carrier gas inlet 11) into the motor chamber 29. The carrier gas increases a pressure within an upstream end 29b of the motor chamber to reduce the likelihood of backflow of carrier gas from the powder chamber 65 of the auger housing 2. The carrier gas enters motor chamber 29, passes through passage 28 to downstream of the motor, through a gap 33 between the motor shaft 35 and the coupling shaft 9 to an inner cavity 13 in the coupling shaft 9, and out holes 30 and 32 into downstream portions 29a, 29b of the motor chamber 29.

The powder hose 12 directs the carrier gas and carried powder 26 to a spray gun (not illustrated). The powder hose 12 has a proximal end (the left end in FIGS. 1 and 2) and a distal end (not illustrated). The distal end is connected to the spray gun. The powder hose fitting 84 securely affixes the powder hose 12 to the auger housing 2. The powder hose fitting 84 has a proximal end (the left end in FIGS. 1 and 2) affixed to the auger housing, a distal end (the right end in FIGS. 1 and 2) for receiving the proximal end of the powder hose, and a through-hole therebetween made to at least partially to receive the distal end of the auger sleeve 61.

Feeder Operation During Spray Gun Startup and Operation

Carrier gas is supplied to the apparatus through the nipple 11. Carrier gas is supplied through the channel 25 into the inner chamber 41 and is also supplied to the ports 21 and 14 (via pressure equalizing tubing 62 and 63, respectively) to create pressure, respectively, in both hopper 1 and motor chamber 29 to prevent flow of powder backwards through the gap between the auger 10 and the wall of the first auger bore 64 into the motor chamber and to prevent the flow of carrier gas through the gap 85 into powder chamber 65 and then into the hopper 20 during startup operation of the spray gun when pressure inside the hopper 1 and motor chamber 29 is equal to atmospheric pressure. During startup operation, carrier gas pressure in hopper 1 and motor chamber 29 gradually increases until a balance between back pressure from the gun through the powder hose 12 and pressures in hopper 1 and motor chamber 29 is reached. At this point carrier gas flows primarily through the channel 25 into the internal chamber 41 and further through the multiple holes 40 in the auger sleeve 61. Inside the auger sleeve 61, carrier gas flow (illustrated by arrow 80) picks up the powder supplied by the auger 10 (when it rotates) and carries the powder through the powder hose 12 to the powder dispenser or spray gun. In this regard, a powder material is supplied directly into a powder hose, bypassing collecting cones, voids, pockets, and other channels, where powder accumulation may occur, creating a uniform flow that is both free from pulsation and is unaffected by flowability characteristics of powders being used.

Feeder Operation During Spray Gun Shutdown:

When the spray gun is shut down, the supply of the carrier gas to the inlet nipple 11 stops and the pressure in the powder hose quickly drops to atmospheric level. At this point carrier gas in the hopper 1 and motor chamber 29 tends to escape through the powder hose 12 using all available passages inside the powder feeder, such as: tubing 62 and 63 and gap 85 between auger 10 and auger sleeve 61. While tubing 62 and 63 are intentionally designed for this purpose, gas flow 86 escaping through the gap 85 is extremely undesirable, since it picks up powder 19 from the hopper 1 and delivers the powder all the way to the spray gun. This generates undesirable powder losses. To prevent such powder loss, embodiments of the invention may comprise the porous powder filter 82 (described above). The porous powder filter 82 forms a circumferential cavity 83 which is connected to the internal chamber 41 by carrier gas release bore 87. So, during gun shutdown the carrier gas from hopper 1 flows down towards the powder chamber 65 and escapes through the pores in the porous powder filter 82 into the cavity 83 and further through bore 87 into the internal chamber 41, and further again through the holes 40 into the auger sleeve 61 and the powder hose 12 (illustrated by arrow 81). The total porosity attributed to the permeability of the porous powder filter 82 should be high enough so that the gas flow reaching the gap 85 (illustrated by arrow 86) is so low that it cannot pickup powder in this gap and bring it to the powder hose 12, thereby preventing powder afterflow.

Figure 3:
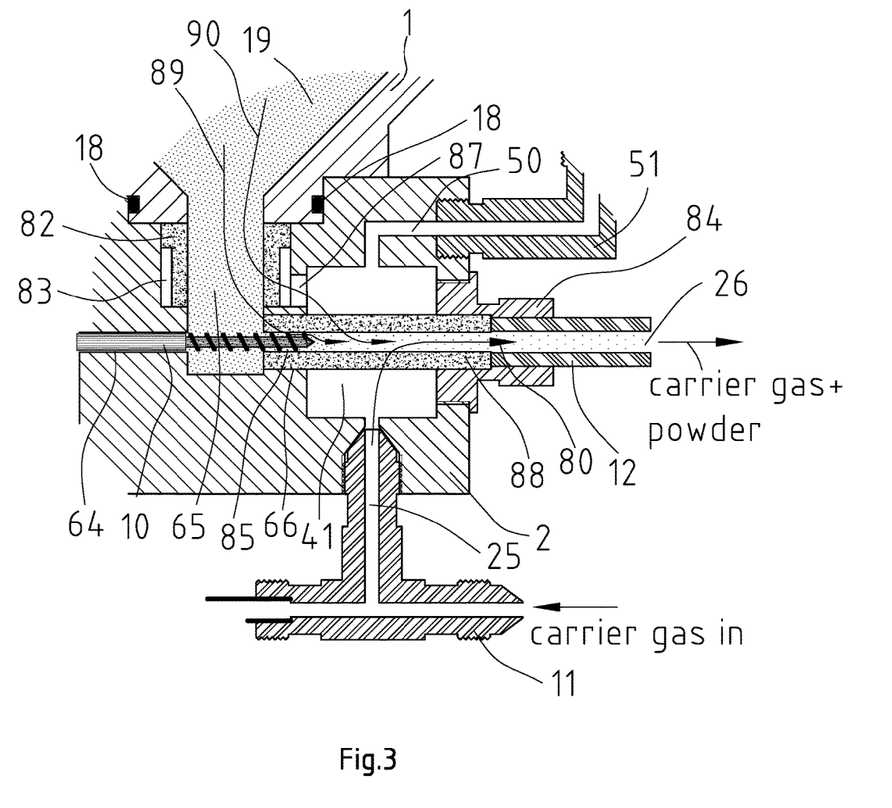
FIG. 3 is an enlarged view of a portion of a powder feeding apparatus, in accordance with alternative embodiments of the invention.

The total flow of the carrier gas can be very low for some industrial processes, for example for laser cladding, where it can be as low as 1-3 liters/minute. At these low flows it may be possible that some amount of powder that is supplied into the auger sleeve 61 by auger 10 can escape through the holes 40 into the internal chamber 41, creating undesirable powder accumulation in the internal chamber 41. To prevent this, a porous auger sleeve could be used instead of a solid one having multiple holes. Referring now to FIG. 3, a powder feed assembly (such as for an enriched air flame spray apparatus) of alternative embodiments of the invention comprises a powder hopper 1, an auger housing 2, an auger 10 within the auger housing, a carrier gas inlet 11 affixed to the auger housing, a powder hose 12 attached to the auger housing 2 via a powder hose fitting 84, and an electric motor (not illustrated) housed within a motor housing (not illustrated) that is attached to the auger housing 2. The powder hopper, auger, motor, and motor housing of FIG. 3 is the same as is illustrated in FIGS. 1-2.

The powder feed assembly of FIG. 3 comprises a porous auger sleeve 88. The porous auger sleeve 88 of FIG. 3 is positioned and functions in the same way as the auger sleeve 61 of FIGS. 1 and 2. However, the porous auger sleeve 88 of FIG. 3 comprises a sponge-like solid material having a high porosity such that the carrier gas can permeate through but the powder cannot. The porous auger sleeve 88 is typically constructed of a metal, such as brass, bronze, steel, or the like. With the porous auger sleeve 88, powder cannot escape into the internal chamber 41, since the pores' size of the porous auger sleeve 88 is smaller than the powder particle size. In FIG. 3, arrow 90 represents the main carrier gas flow during spray gun shutdown and arrow 89 represents the minor flow.

Figure 4:
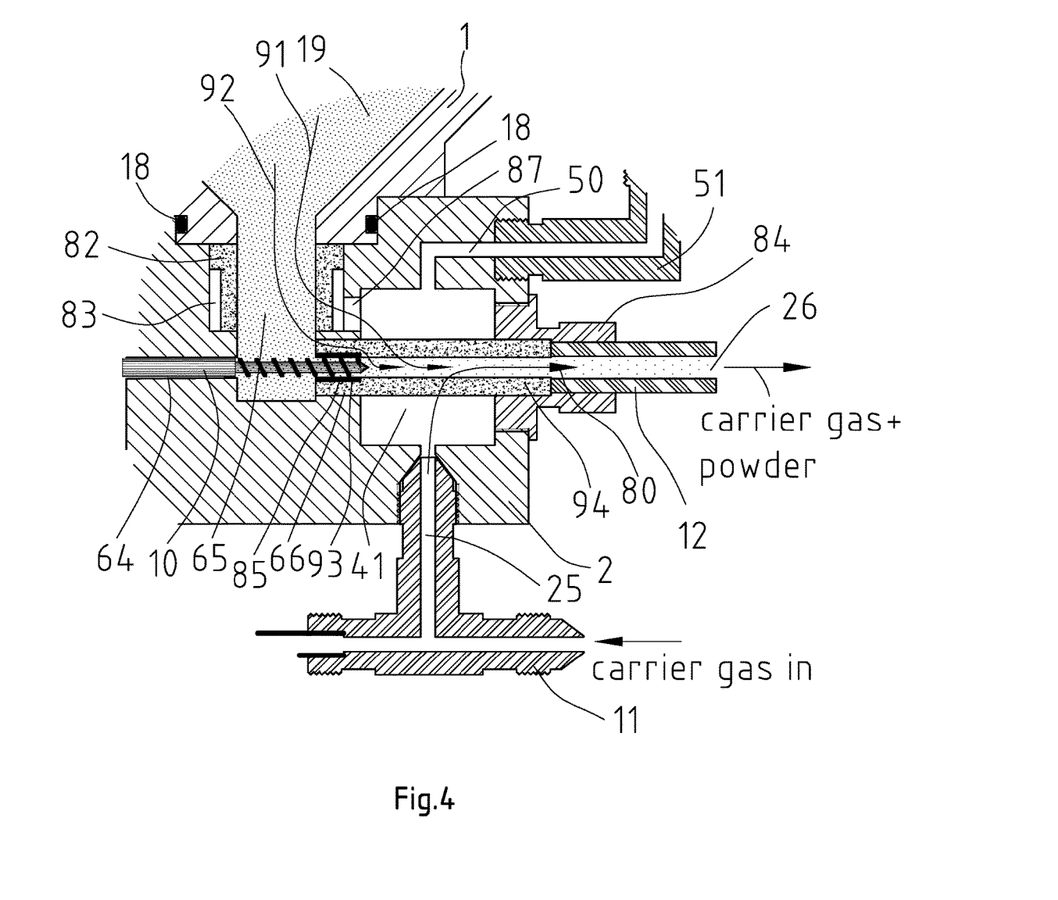
FIG. 4 is an enlarged view of a portion of a powder feeding apparatus, in accordance with further alternative embodiments of the invention.

Since the minor gas flow 89 in FIG. 3 still can pick up some powder from the gap 85, another alternative powder feed assembly is illustrated in FIG. 4. The powder feed assembly (such as for an enriched air flame spray apparatus) of alternative embodiments of the invention illustrated in FIG. 4 comprises a powder hopper 1, an auger housing 2, an auger 10 within the auger housing, a carrier gas inlet 11 affixed to the auger housing, a powder hose 12 attached to the auger housing 2 via a powder hose fitting 84, and an electric motor (not illustrated) housed within a motor housing (not illustrated) that is attached to the auger housing 2. The powder hopper, auger, motor, and motor housing of FIG. 4 is the same as is illustrated in FIGS. 1-2. The powder feed assembly of FIG. 4 comprises a porous auger sleeve 94, similar to the porous auger sleeve 88 of FIG. 3. However, the powder feed assembly of FIG. 4 further comprises a small sleeve 93 made from a solid material and surrounding the auger's distal (downstream) end. In FIG. 4, arrow 91 represents the main carrier gas flow during spray gun shutdown and arrow 92 represents the minor flow. In this alternative embodiment of FIG. 4, the minor carrier gas flow (illustrated by arrow 92) cannot pickup powder from the gap 85, since the minor carrier gas flow is separated from the gap 85 by the sleeve 93.

Figure 5:
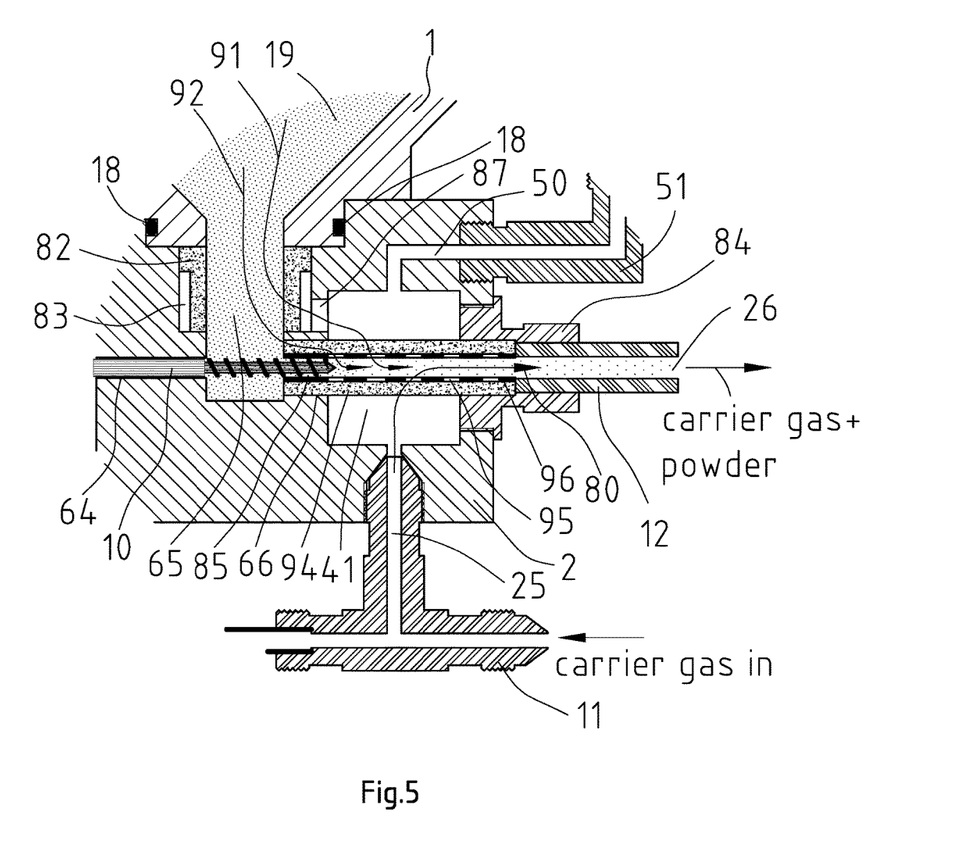
FIG. 5 is an enlarged view of a portion of a powder feeding apparatus, in accordance with yet further alternative embodiments of the invention.

The powder feed assembly of FIG. 5 comprises an auger sleeve that has properties of the auger sleeve of FIGS. 1 and 2, the auger sleeve of FIG. 3, and the auger sleeve of FIG. 4, in that the auger sleeve of FIG. 5 has both a porous portion 94 and a solid portion 96 with a plurality of radial holes 95 past the distal end of the auger 10. The porous portion 94 surrounds the solid portion 96. The porous portion 94 comprises a sponge-like solid material having a high porosity such that the carrier gas can permeate through but the powder cannot. The porous portion 94 of the auger sleeve of FIG. 5 provides the above-described benefit of preventing powder from escaping into the internal chamber 41, since the pores' size of the porous portion 94 is smaller than the powder particle size. Additionally, the solid portion with radial holes provides added wear resistance as compared to the porous sleeve 94 of FIG. 4.

The porous auger sleeve of FIG. 5 is positioned and functions in the same way as the auger sleeves of the other figures. In FIG. 5, arrow 91 represents the main carrier gas flow during spray gun shutdown and arrow 92 represents the minor flow.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

That which is claimed:

1. A powder feed assembly comprising:
a powder hopper having a wall, a lid, and a sloped floor together forming a chamber, and having an opening defined in the floor;
a motor within a motor chamber defined in a motor housing, the motor having a selectively rotatable shaft connected to an auger holder;
an auger housing positioned to receive a powder from the opening in the hopper floor into a corresponding powder chamber defined in the auger housing, the motor housing being affixed to the auger housing, the auger housing defining (i) a first auger bore providing an opening between the motor chamber and the powder chamber and (ii) a second auger bore providing an opening between the powder chamber and an inner chamber defined in the auger housing;
an auger at least partially within the auger housing, the auger having a proximal end and a distal end, the auger having a shaft and a spiral blade projecting from the shaft, the proximal end of the auger protruding through the first auger bore and connecting to the auger holder and the distal end of the auger protruding at least partly through the second auger bore such that the auger is selectively rotatable to propel the powder from the powder chamber past the distal end of the auger when the auger is selectively rotated;
a porous gas-permeable powder filter positioned within the powder chamber and shaped such that a circumferential cavity is defined around the powder filter, the circumferential cavity being fluidly connected via a carrier gas release bore to the inner chamber of the auger housing;

a carrier gas inlet affixed to the auger housing for receiving a carrier gas and introducing the carrier gas into the inner chamber of the auger housing;

an auger sleeve within the auger housing and positioned at least partially within the inner chamber, the auger sleeve having a wall defining an internal bore positioned to receive the distal end of the auger and therefore the propelled powder, at least a portion of the wall of the auger sleeve past the distal end of the auger allows at least some of the carrier gas to flow or permeate through the auger sleeve wall and into the internal bore of the auger sleeve to pick up and carry the propelled powder out of the auger housing; and a powder hose for directing the carrier gas and carried powder from the auger housing to a powder dispenser, the powder hose having a distal end adapted to be connected to the powder dispenser and a proximal end connected to the auger housing.

2. The assembly of claim 1, wherein a plurality of openings are defined in the wall of the auger sleeve.

3. The assembly of claim 1, wherein the auger sleeve is made from a porous gas-permeable material.

4. The assembly of claim 3, further comprising an additional solid auger sleeve positioned within at least portion of the internal bore of the auger sleeve, the solid auger sleeve positioned to receive the distal end of the auger.

5. The assembly of claim 4, wherein the solid auger sleeve comprises a cylindrical wall having a plurality of openings defined in the wall past the distal end of the auger.

6. The assembly of claim 1, wherein the powder hose is connected to the auger housing via the auger sleeve.

7. The assembly of claim 1, further comprising:

a first carrier gas tube fluidly connecting the inner chamber of the auger housing to the chamber of the powder hopper such that carrier gas can move freely between the inner chamber of the auger housing and the chamber of the powder hopper; and a second carrier gas tube fluidly connecting the inner chamber of the auger housing to an inner chamber of the motor housing such that carrier gas can move freely between the inner chamber of the auger housing and the inner chamber of the motor housing.

* * * * *